US009779327B2

(12) United States Patent
Allen et al.

(10) Patent No.: US 9,779,327 B2
(45) Date of Patent: Oct. 3, 2017

(54) COGNITIVE TRAITS AVATAR FOR SIMILARITY MATCHING

(71) Applicant: International Business Machines Corporation, Armonk, NY (US)

(72) Inventors: Corville O. Allen, Morrisville, NC (US); Alissa J. Hartenbaum, Maple Glen, PA (US); Trenton J. Johnson, Raleigh, NC (US); Joseph N. Kozhaya, Morrisville, NC (US); Laura J. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 14/832,043

(22) Filed: Aug. 21, 2015

(65) Prior Publication Data

US 2017/0053186 A1    Feb. 23, 2017

(51) Int. Cl.
G06K 9/00 (2006.01)
G06F 3/048 (2013.01)
G06K 9/62 (2006.01)
G06T 11/00 (2006.01)
G06K 9/46 (2006.01)

(52) U.S. Cl.
CPC ............ *G06K 9/6215* (2013.01); *G06K 9/46* (2013.01); *G06T 11/00* (2013.01)

(58) Field of Classification Search
CPC ...... G06K 9/6202; G06K 9/6203; G06K 9/00; G06F 17/30256; G06F 21/32; G06F 221/31; G06F 21/316; G06F 21/36; G06F 17/30764; G06T 7/001; H04L 63/0861; H04L 9/3231

USPC ................ 382/100, 115, 218; 715/706, 765; 706/52, 54, 46; 704/9, 270.1, E11; 707/802, 774, 999; 705/7.14, 14.44
See application file for complete search history.

(56) References Cited

U.S. PATENT DOCUMENTS

2002/0082077 A1*  6/2002  Johnson ................. A63F 13/12
                                                    463/30
2009/0249234 A1   10/2009  Zilca et al.
2009/0287678 A1   11/2009  Brown et al.
(Continued)

OTHER PUBLICATIONS

Balsiger, Peter W. et al., "Context Based Social Network Profile Picture", IP.com Prior Art Database Technical Disclosure, IP.com No. 000239764, Dec. 1, 2014, 9 pages.
(Continued)

*Primary Examiner* — Sheela C Chawan
(74) *Attorney, Agent, or Firm* — Stephen J. Walder, Jr.; Diana R. Gerhardt

(57) ABSTRACT

Mechanisms for generating a cognitive traits avatar are provided. The mechanisms analyze a portion of content submitted by a user to extract features of the portion of content. The mechanisms map the extracted features to one or more cognitive traits and select an image corresponding to the one or more cognitive traits. The mechanisms further generate a cognitive traits avatar comprising the selected image and cognitive traits data defining a graphical representation of the one or more cognitive traits for output in association with the selected image. The cognitive traits avatar is output as part of an interaction of the user with another entity, or representation of another entity, via a computing device.

18 Claims, 7 Drawing Sheets

(56) References Cited

U.S. PATENT DOCUMENTS

| | | | |
|---|---|---|---|
| 2010/0046806 A1* | 2/2010 | Baughman | G06F 21/316 382/115 |
| 2011/0066587 A1 | 3/2011 | Ferrucci et al. | |
| 2011/0125734 A1 | 5/2011 | Duboue et al. | |
| 2011/0179116 A1 | 7/2011 | Solomon et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2013/0257877 A1* | 10/2013 | Davis | G06T 13/80 345/473 |
| 2014/0204119 A1* | 7/2014 | Malamud | G06T 19/006 345/633 |
| 2015/0067822 A1* | 3/2015 | Randall | G06F 21/32 726/17 |

OTHER PUBLICATIONS

High, Rob, "The Era of Cognitive Systems: An Inside Look at IBM Watson and How it Works", IBM Corporation, Redbooks, Dec. 12, 2012, 16 pages.

Mahmud, Jalal, "IBM Watson Personality Insights: The science behind the service", IBM Corporation, https://developer.ibm.com/watson/blog/2015/03/23/ibm-watson-personality-insights-science-behind-service/, Mar. 23, 2015, 7 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

\* cited by examiner

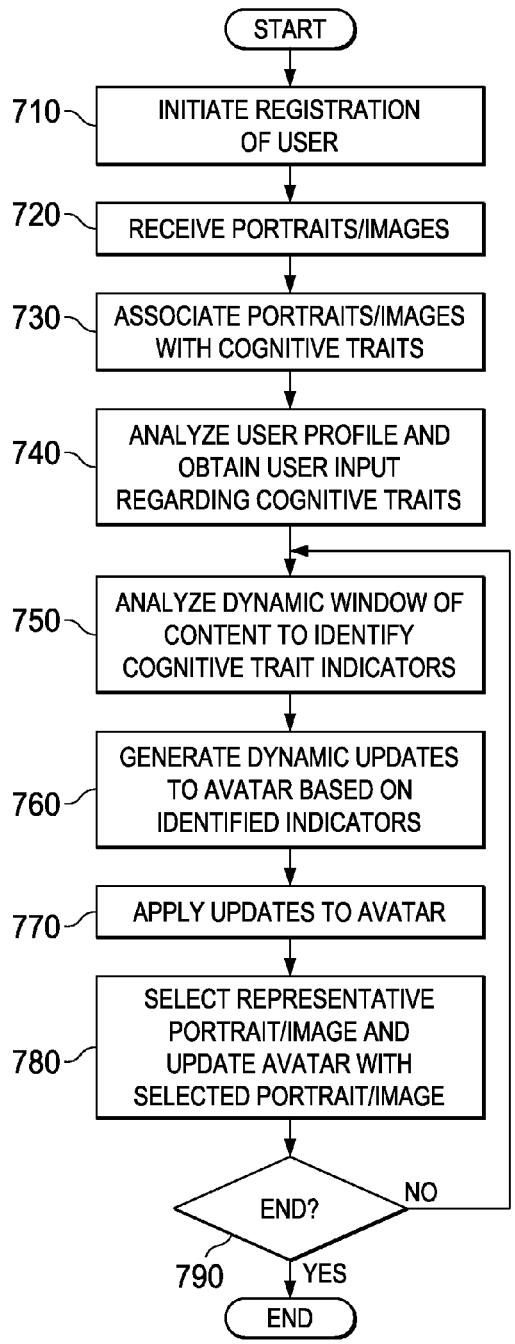
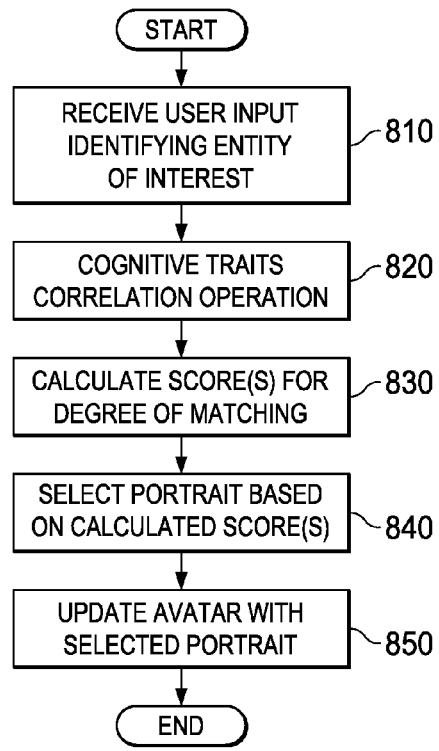
FIG. 7
FIG. 8

COGNITIVE TRAITS AVATAR FOR SIMILARITY MATCHING

BACKGROUND

The present application relates generally to an improved data processing apparatus and method and more specifically to mechanisms for generating a cognitive traits avatar that can be used to perform similarity matching between entities, e.g., persons, places, things, or the like.

With the proliferation of information available on computing networks, such as the Internet, users look to these computer networks as a primary source of information, a significant source of social interaction, and a means by which users are able to obtain products and services. Most people in today's society utilize such computer networks to perform various forms of commerce, on-line electronic commerce (e-commerce), using online commerce websites such as Amazon™, Ebay™, and the like, as well as to find and communicate with other persons in a business and social manner, e.g., social media and networking websites such as Facebook™, Instagram™, LinkedIn™, and the like.

A key type of information that users often look for when engaging in e-commerce or social media interactions is ratings of persons, products, or services. A known mechanism for rating persons, products, or services is to elicit user feedback regarding the persons, products, or services and then displaying a representation of the feedback score for the persons, products, or services, where the feedback score is an aggregate of the user feedback obtained from a plurality of users on a fixed scale. For example, often times this feedback score is represented graphically as a rating along a fixed scale of 1 to 5 stars with the stars being a representation of the aggregate user feedback score. Similar feedback mechanisms may present percentages of "thumbs up" or positive reviews and percentages of "thumbs down" or negative reviews. Such feedback scores may be provided in a number of different categories of information.

While such rating scales provide a good quick metric for evaluating a person, product, or service, there is very little in such a scoring mechanism that can be applied in a personalized way to a particular user. That is, the rating is generic in nature and does not necessarily identify the compatibility of person, product, or service with a particular person's own traits.

SUMMARY

In one illustrative embodiment, a method, in a data processing system comprising a processor and a memory, the memory providing instructions to the processor to cause the processor to implement a cognitive traits avatar system, for generating a cognitive traits avatar, is provided. The method comprises analyzing, by the cognitive traits avatar system of the data processing system, a portion of content submitted by a user to extract features of the portion of content. The method further comprises mapping, by the cognitive traits avatar system, the extracted features to one or more cognitive traits. Moreover, the method comprises selecting, by the cognitive traits avatar system, an image corresponding to the one or more cognitive traits and generating, by the cognitive traits avatar system, a cognitive traits avatar comprising the selected image and cognitive traits data defining a graphical representation of the one or more cognitive traits for output in association with the selected image. The method also comprises outputting, by the cognitive traits avatar system, the cognitive traits avatar as part of an interaction of the user with another entity, or representation of another entity, via a computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart outlining an example operation for generating a cognitive traits avatar in accordance with one illustrative embodiment; and FIG. 8 is a flowchart outlining an example operation for correlating cognitive traits of cognitive traits avatars in accordance with one illustrative embodiment.

DETAILED DESCRIPTION

Figure 1:
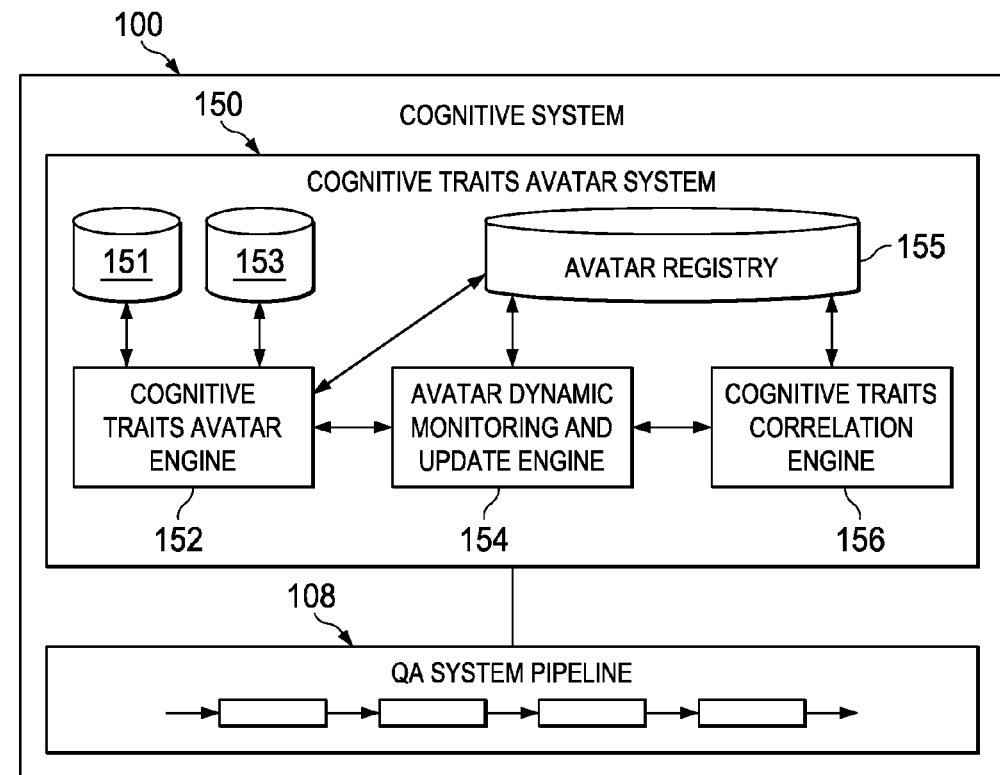
FIG. 1 depicts a schematic diagram of one illustrative embodiment of a question/answer creation (QA) system in a computer network.
Figure 1:
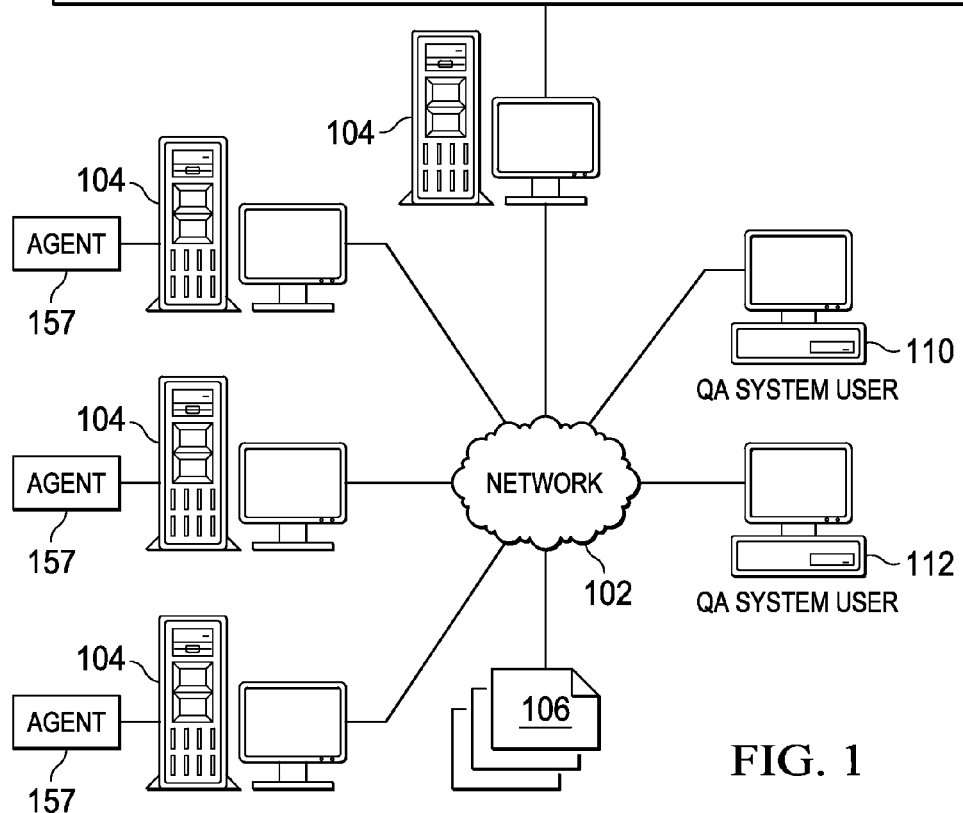

The illustrative embodiments provide mechanisms for generating a cognitive traits avatar that can be used to perform similarity matching between entities, e.g., persons, places, things, or the like. The illustrative embodiments generate a dynamically changing cognitive trait avatar which provides an intuitive and elegant visualization of a person's personality trait-balance versus personality trait-dominance. In one illustrative embodiment, this visualization is dynamically adjusted based on a user's social media presence as the user's social media presence changes over time. For example, a moving window of content submitted by the user to a social media website may be analyzed to identify adjustments to a previously generated state of the cognitive trait avatar.

When a user associated with the cognitive trait avatar is involved in, initiating, or otherwise preparing for or engaging in an interaction with another entity, e.g., communicating with another user, an item, an event, an application, service, or the like (referred to herein collectively as another "entity"), such as for purchasing or using the item, application, or service, cognitive traits associated with the other entity may be compared to the current state of the cognitive trait avatar to determine a degree of correlation between the cognitive traits of the cognitive trait avatar and the cognitive traits associated with the other entity. Based on the degree of correlation between the cognitive traits and which cognitive traits are matched by the correlation, a visual representation of the correlation is output to the user. For example, a plurality of pictures of the user having different emotional representations, e.g., facial expressions of mood, in the pictures (referred to herein as "personality insight portraits") may be provided and associated with the different cognitive traits of the cognitive trait avatar. Based on the matching cognitive traits and degree of matching, a corresponding personality insight portrait may be selected and output in association with the cognitive traits avatar.

In one illustrative embodiment, the cognitive trait avatar is represented as a "halo" or circular representation in which sub-portions, or arcs, of the halo are color coded to correspond to different cognitive traits (or personality traits) of the particular user as determined from the analysis of the moving window of content. The arcs have sizes that correspond to the degree of dominance of particular cognitive trait. In some illustrative embodiments, these arcs correspond to a set of primary cognitive traits with each primary cognitive trait being sub-divided into a number of sub-traits, which may be viewed when drilling down into the cognitive trait avatar representation. It should be appreciated that the representation of the halo and the individual arcs may be dynamically updated as the user continues to provide additional content to the monitored and analyzed social networking websites. Thus, for example, each arc of the halo may represent a percentage of the user's contributions to the social networking websites that the particular cognitive trait corresponds to and may have a corresponding color and size, e.g., 43% Extraversion, 78% Conscientiousness, 72% Agreeableness, 93% Openness, 33% Emotional Range, etc.

It should be noted that these measures of cognitive traits do not sum to 100% but represent percentages of how much of the user's interactions with the social networking website, either historically, within the moving window, or a combination of both, correspond to that particular type of cognitive trait. It should be appreciated that a single statement by a user in the social networking website may correspond to multiple different cognitive traits.

The cognitive trait avatar's halo may be provided surrounding a currently selected personality insight portrait that corresponds to the current cognitive traits (personality traits) of the user. In some illustrative embodiments, the personality insight portrait presents a pictorial representation of the particular user and the current dominant cognitive trait(s) of the user, e.g., if the user's current dominant trait is conscientiousness, then a personality insight portrait associated with conscientiousness may be selected, such as a picture of the user with an expression that is illustrative of focusing or concentrating on something, such as the user in a position and with an expression of considering an idea. Alternatively, in one illustrative embodiment, while the halo may be based on historical analysis of the user's contributions to the one or more monitored and analyzed social network website, the personality insight portrait may be based on a moving window of the contributions to the social network or other input indicative of the user's current cognitive (or personality) traits, i.e., representing the current mood of the user or viewpoint of the user. Again, the personality insight portrait portion and/or halo of the cognitive trait avatar may be dynamically updated. As such, changes to the personality insight portrait portion may be discerned by users more frequently than changes to the halo portion.

The cognitive trait avatar may be used to represent the user in various interactions with other users and with other entities. The cognitive trait avatar may be presented to users during conversations or other interactions so that the other users may be given a representation of the person with which they are interacting. Thus, user A's cognitive trait avatar may be displayed on user B's client computing device while user B is conversing with or otherwise interacting with user A, and vice versa. In this way, both users are given an indication of the cognitive traits of the user as well as their current emotional status as indicated by the personality insight portrait. The personality insight portrait may be dynamically updated based on a moving window of content of the user's contributions to the conversation with the halo portion of the cognitive trait avatar being updated dynamically as well, but with the changes being possibly less noticeable than the changes to the personality insight portrait, especially if the halo portion is at least partially based on a historical analysis of the user's contributions to social networking websites.

The cognitive trait avatar may further be used to compare the user's representation of their cognitive traits with the cognitive traits of other users, products, items, services, events, and other entities to determine compatibility between the user and these other entities. The user's personality insight portrait may be modified to represent the degree of compatibility between the user and these other entities. For example, if the user's dominant cognitive traits include conscientiousness, and a particular product that the users is interested in is associated with the conscientiousness cognitive trait, then the personality insight portrait may be modified to indicate a strong compatibility between the user and the product. The cognitive traits associated with other entities, other than human beings, may be developed over time based on ratings provided to these other entities by users that have their own cognitive trait avatars, for example. Thus, for example, if a majority of users that highly rate a product, have purchased the product, or otherwise given positive feedback regarding the product, have the "conscientiousness" cognitive trait as a dominant trait, then the conscientiousness cognitive trait may be associated with that product.

It should be appreciated that a similar cognitive traits avatar may be generated and displayed to users for various other types of entities other that human beings. Thus, in the example, above, a cognitive trait avatar may be generated for a product with corresponding halo portion representing the cognitive traits associated with the product. It should be appreciated that for non-human entities, the personality insight portrait portion of the cognitive traits avatar may be static and may represent the particular entity.

While the above illustrative embodiments are described with regard to the particular user's personality insight portrait being the one that is modified to represent the degree of correspondence between the user's cognitive traits and those of another entity, it should be appreciated that cognitive trait avatars for a plurality or all of the entities involved in an interaction may be dynamically updated to reflect correspondence of cognitive traits and/or current cognitive traits (personality traits) and moods of the entities. Thus, for example, rather than the personality insight portraits of other entities being static, in some cases the cognitive traits avatar for the other entity or entities may be dynamic based on a correspondence between the cognitive traits of the user and the cognitive traits of the entity, e.g., a user looking to purchase a pet may have the personality insight portrait of individual cognitive trait avatars associated with different pets change based on whether the pet is determined to have similar cognitive traits to the particular user, e.g., a dog of breed A that is known to work well with people having cognitive trait X will have its personality insight portrait changed to the dog in a playful stance when the user has cognitive trait X as a dominant cognitive trait.

In still further illustrative embodiments, the cognitive trait avatar of a user may be dynamically updated as the user interacts with a portion of text, such as a document, or the like. Natural language processing may be used to extract features from the portion of text and these features may be matched to one or more cognitive traits. By comparing the features of the textual content to the current status of the user's cognitive traits as indicated in the user's dynamically changing cognitive trait avatar, the personality insight portrait of the cognitive trait avatar may be dynamically updated to reflect the user's alignment with regard to the content of the portion of text, e.g., whether the user is likely to agree with, like, or otherwise look favorably on the portion of text or not.

With the mechanisms of the illustrative embodiments, users are able to quickly identify other user's cognitive traits (personality traits) and identify whether the traits match their own or not through an easily identifiable visualization, referred to herein as the cognitive traits avatar. Through this cognitive traits avatar, users are made aware as to the current and/or historical status of another user's cognitive traits, current mood or emotional state, etc. Moreover, in some illustrative embodiments, the cognitive traits avatar visualization allows for easily identifiable matches or mis-matches between users and other entities to assist in decision making or better understanding of other parties in an interaction.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments may be utilized in many different types of data processing environments. For example, the illustrative embodiments may be implemented with any computing system in which an output of a person's cognitive, or personality, traits is helpful during interactions. Moreover, the mechanisms of some of the illustrative embodiments may be implemented in any computer system in which the correlation or correspondence between a user's own individual cognitive, or personality traits and the cognitive/personality traits associated with other persons, products, services, events, and other types of entities, is used to facilitate the interaction of a user with other entities. In general, these computer systems may comprise cognitive systems that facilitate the answering of questions, interaction of people with one another via electronic communication systems such as social networking websites or the like, electronic recommendation systems that provide recommendations to users based on an analysis of the user's profile and features of the entities being recommended, online electronic commerce via one or more websites, or a plethora of other computer based systems and services.

In order to provide a context for the description of the specific elements and functionality of the illustrative embodiments, FIG. 1 is provided hereafter as an example environment in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environment may be made without departing from the spirit and scope of the present invention.

FIG. 1 is directed to describing an example cognitive system which, in the depicted example, implements a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments may be integrated in, augment, and extend the functionality of these QA mechanisms of the cognitive system with regard to outputting a cognitive traits avatar representation of a user as part of an interaction and/or facilitating the identification of a correlation between the cognitive traits of a user and other entities as part of a cognitive operation.

In this context, the interactions may be electronic communications between two or more users via one or more electronic communication systems, such as social networking websites, electronic mail, instant messaging, or the like. In this context, cognitive operations may involve any operation in which a correlation between entities is utilized, such as answering of questions, electronic recommendations, electronic commerce via one or more websites, or the like. In general, any application where user ratings are helpful to decision making may be improved by implementing the mechanisms of the illustrative embodiments to facilitate correlation of cognitive, or personality, traits with traits of other entities.

In one illustrative embodiment, the mechanisms of the illustrative embodiments may be used with a cognitive system that implements a Question and Answer (QA) system and corresponding QA system pipeline. In such a case, the question submitted to the QA system may be of the type asking for recommendations, requesting a search for a desired entity (person, place, product, event, service, or other entity), or the like. It should be appreciated that the implementation of the illustrative embodiments with a QA system and/or QA system pipeline is not a requirement and is only one possible implementation. The illustrative embodiments may be utilized with any cognitive system that utilizes a cognitive traits avatar as described hereafter.

It should be appreciated that the cognitive system mechanisms and QA mechanisms described in FIG. 1, and subsequent figures, are only examples and are not intended to state or imply any limitation with regard to the type of cognitive system mechanisms and QA system mechanisms with which the illustrative embodiments are implemented. Many modifications to the example cognitive system shown in FIG. 1, and mentioned in connection with the other figures, such as FIG. 5, may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, the QA system pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100, in the depicted example, is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing logic to generate, output, and dynamically modify, a cognitive traits avatar and for utilizing the cognitive traits avatar during interactions via electronic communication systems and/or the performance of cognitive operations. These augmentations are generally depicted in FIG. 1 as cognitive traits avatar system 150 which comprises the mechanisms for performing the operations described herein with regard to the generation, output, dynamic modification, and utilization of a cognitive traits avatar to facilitate interactions and cognitive operations using the cognitive system 100 and/or other electronic interaction services made available, and with which the cognitive traits avatar system 150 interfaces via the at least one network 102, via the one or more other computing systems 104.

As discussed previously, the cognitive traits avatar system 150 provides mechanisms, such as the cognitive traits avatar engine 152, for generating a cognitive traits avatar that can be used to output a representation of the current cognitive, or personality, trait status of a user. The cognitive traits avatar system 150 generates a dynamically changing cognitive trait avatar which provides an intuitive and elegant visualization of a person's personality trait-balance versus personality trait-dominance. In one illustrative embodiment, this visualization is dynamically adjusted based on a user's social media presence as the user's social media presence changes over time. For example, a moving window of content, e.g., the last 2000 characters of text entered by a user submitted by the user of a computing device 110 to a social media website hosted by a computing system 104, via the network 102, may be analyzed using natural language processing (NLP) mechanisms and algorithms by the cognitive traits avatar system 150 to identify an initial set of cognitive trait states for a user and/or thereafter identify adjustments to a previously generated state of the cognitive trait avatar. This moving window moves as time progresses such that at any point in time, the window comprises the last 2000 characters, for example, or other predetermined amount of content, which is analyzed to identify a current status of cognitive traits for the user.

The NLP mechanisms of the cognitive traits avatar system 150 may utilize elements of a QA system pipeline 108 to perform such NLP operations, such as extracting features from the moving window of content. These NLP operations may be further augmented by the logic of the cognitive traits avatar system 150 to correlate the extracted features with one or more cognitive traits of a user. For example, mapping data structures 151 may be established for mapping terms, phrases, topics, concepts, punctuation, character format, e.g., font, size, capitalization, etc., and the like to various cognitive traits. For example, phrases such as "sure, that sounds good" or "I'm okay with that" or "that sounds like fun" may be analyzed and correlated to a cognitive trait that the user is generally agreeable and has a higher Agreeableness cognitive trait. Similarly, phrases like "I want to party" or "We had a great time at the game," use of exclamation points, use of capitalization of entire words or phrases, or the like may be indicative of a person who is more of an extrovert than a person that makes statements that he "stayed at home" or "watched tv" or "played video games" which is more indicative of an introvert. Through analysis of current interactions (i.e. within a defined moving window of text or number of interactions) and/or a history of interactions with a social networking website, or plurality of social networking websites, or other systems/services that provide electronic communication in a textual format, voice-to-text format, or the like, the cognitive traits avatar system 150 is configured to extract features from these interactions and correlate the features with cognitive traits to help define a representation of the user's personality, i.e. the collection of cognitive traits.

In one illustrative embodiment, the mechanisms of the illustrative embodiment may utilize the IBM Watson™ Personality Insights service available from IBM Corporation (see the IBM Developer website for more information). The IBM Watson™ Personality Insights service uses linguistic analytics to infer cognitive and social characteristics, including Big Five, Values, and Needs, from communications that the user makes available, such as electronic mail messages, text messages, tweets, forum posts, and more. To infer personality characteristics from textual information, the input text is tokenized and matched with a psycholinguistic dictionary to compute scores in each dictionary category. The service then builds inferences by matching words from the text with words from the dictionaries. Such words are often self-reflective, such as words about work, family, friends, health, money, feelings, achievement, and positive and negative emotions. The service then uses a weighted combination approach to derive Big Five and facet scores from the psycholinguistic dictionary category scores. The weights are the coefficient between category scores and characteristics, using coefficients that were derived by comparing personality scores obtained from surveys with psycholinguistic dictionary category scores from text for a large group of individuals, e.g., approximately 500 individuals in some embodiments.

In some illustrative embodiments, a user profile in a user profile database 153 associated with the cognitive system 100 may further be analyzed and evaluated to generate an initial personality or cognitive traits profile of the user that includes initial setting values of the cognitive traits of the cognitive traits avatar for the user. For example, education level, socio-economic status, occupation, and the like may all be analyzed and correlated with different types, and degrees or correspondence, of cognitive traits based on general identifications of the aggregate cognitive traits of individuals having those characteristics in a user profile, to provide a baseline set of cognitive traits. In some illustrative embodiments, the user him/herself may set forth the cognitive traits that the user believes best represents the user when the user registers with the cognitive system 100, for example, and this set of user selected cognitive traits may be used as the baseline of cognitive traits upon which to build the cognitive traits avatar for the user.

The baseline of cognitive traits may then be further customized to the particular user based on the analysis of current and/or historical interactions with one or more electronic communication systems/services (hereafter assumed to be a social networking website for ease of description purposes). For example, NLP mechanisms may be used to analyze a history of the contributions the user has made to a social networking website to generate an updated baseline set of cognitive traits. Thereafter the NLP mechanisms may be used on a moving window of content to generate a set of updates to the baseline cognitive traits based on the user's current demonstrated cognitive traits in their contributions to interactions. These updates may be temporarily or permanently applied to the baseline cognitive traits to generate an updated cognitive traits avatar for the user. In some cases, the updates are permanently applied so as to generate a new baseline set of cognitive attributes and corresponding updated cognitive traits avatar that is stored in the cognitive traits avatar registry 155. This set of values for the cognitive traits of the user that are part of the cognitive traits avatar are dynamically updated as the user provides more interaction with social networking websites.

Based on the values associated with the various cognitive traits determined by the cognitive traits avatar system 150, a cognitive traits avatar is generated by the cognitive traits avatar engine 152. The cognitive traits avatar comprises a graphical representation of the current state of the cognitive traits of the user. The graphical representation may include a first portion that represents a graphical summary of the current state of the cognitive traits of the user as well as a second portion that provides an image, such as a portrait or other pictorial representation of the user, selected from a set of images for the user based on the current state of the cognitive traits. The set of images used to generate the second portion of the cognitive traits avatar comprises that have been previously uploaded or otherwise provided to the cognitive traits avatar system 150, or are otherwise accessible by the cognitive traits avatar system 150, and have been previously processed to associate one or more cognitive traits with each of the images. This association may have been part of a user or entity registration process such that during registration the cognitive traits associated with the images corresponding to the registered user or entity are manually or automatically identified, e.g., a user selects the cognitive traits from a listing, image analysis is performed to identify facial features of the user's image and associated those facial features with a particular type of cognitive trait, or the like. It should be appreciated that each image may be associated with one or more cognitive traits.

This cognitive traits avatar generated using the calculated cognitive trait values and the selected image may be stored in a cognitive traits avatar registry 155 which may store cognitive traits avatars for a plurality of users and registered entities associated with the cognitive system 100. This cognitive traits avatar is dynamically updated as monitoring and analysis of the user's contributions to online interactions are performed by the avatar dynamic monitoring and update engine 154. The cognitive traits avatar may be displayed to other users as part of an interaction between the user associated with the avatar and the other users of a social networking website or other electronic communication system/service. For example, the cognitive traits avatar may be displayed in association with a portion of a graphical user interface associated with the user's textual messages, associated with each textual message posted by the user, displayed in response to another user's request on their client device to view the cognitive traits avatar of the associated user, or any of a plethora of other possible associations of the cognitive traits avatar with the contributions the user makes to an interaction between one or more other users via a computing system, such as an electronic communication computing system and/or service.

The avatar dynamic monitoring and update engine 154 may orchestrate the collection of information regarding a user's interactions on one or more electronic communication computing systems and/or services via one or more agents 157 associated with the one or more electronic communication computing systems and/or services hosted on computing devices 104, for example. The agents 157 may be configured to collect information for registered users and provide that information back to the cognitive traits avatar system 150 for processing. The avatar dynamic monitoring and update engine 154 may further orchestrate the analysis by the cognitive traits avatar engine 152 of the received information, e.g., textual content entered by a registered user, by the cognitive traits avatar engine 152 to determine an update to the cognitive traits avatar for the user and then present that back to the computing system 104 for use in displaying to other users as part of an interaction between the user associated with the updated cognitive traits avatar and the other users of the computing system 104, e.g., other users of the social networking website.

The cognitive traits avatar engine 152 and avatar dynamic monitoring and update engine 154 may further operate in association with a cognitive traits correlation engine 156 that provides logic for correlating the cognitive traits of two or more entities based on the cognitive traits avatars associated with these entities as stored in the cognitive traits avatar registry 155. That is, when a user associated with the cognitive traits avatar is involved in, initiating, or otherwise preparing for or engaging in an interaction with another entity, e.g., another user, an item, an event, an application, service, or the like, such as for purchasing or using the item, application, or service, having a textual conversation with the other entity, or the like, a cognitive traits correlation engine 154 may be employed to look up or otherwise identify a cognitive traits avatar or profile associated with the other entity in an entity cognitive traits avatar registry 155. The entity cognitive traits avatar register 155 may store a current state of the cognitive traits avatars for a plurality of users of the cognitive system 100 and/or systems/services that utilize the mechanisms of the cognitive system 100. Moreover, the entity cognitive traits avatar register 155 may further store cognitive traits avatars for other types of entities as well, such as products, services, events, and the like.

The cognitive traits correlation engine 156 compares cognitive traits avatars associated with the other entities to the current state of the cognitive trait avatar of the particular user in question to determine a degree of correlation between the cognitive traits of the cognitive trait avatar and the cognitive traits associated with the other entities. Based on the degree of correlation between the cognitive traits and which cognitive traits are matched by the cognitive traits correlation engine 156, a visual representation of the correlation is output to the user. In one illustrative embodiment, this visual representation of the correlation may comprise dynamically updating the second portion of the user's cognitive traits avatar, i.e. the central image or personality insight portrait, of the cognitive traits avatar, to represent the correlating cognitive traits, represent a positive or negative correlation, or the like. In other illustrative embodiments, both the second portion may be updated to reflect the correlated cognitive traits while a separate indicator of positive/negative correlation may be provided in association with the output of the cognitive traits avatar of the user.

For example, as noted above, during registration with the cognitive system 100, the user may provide a plurality of pictures of the user, or other representative images, indicative of different cognitive traits. In addition, the user may provide pictures or images having or representing different emotional states, e.g., facial expressions of mood, in the pictures or images (referred to hereafter as "personality insight portraits") may be provided and associated with the different cognitive traits of the cognitive trait avatar. Based on the matching cognitive traits and degree of matching identified by the cognitive traits correlation engine 156, a corresponding personality insight portrait may be selected and output in association with the cognitive traits avatar.

As noted above, the cognitive traits avatar of a user may be used to represent the user in various interactions with other users and with other entities. The cognitive traits avatar may be presented to users during conversations or other interactions so that the other users may be given a representation of the person with which they are interacting. Thus, user A's cognitive trait avatar may be displayed on user B's client computing device while user B is conversing with or otherwise interacting with user A, and vice versa. In this way, both users are given an indication of the cognitive traits of the user as well as their current emotional status as indicated by the personality insight portrait. The personality insight portrait may be dynamically updated by the avatar dynamic monitoring and update engine 154 which, in some embodiments, performs such updates based on a moving window of content of the user's contributions to the conversation, as retrieved and provided by one or more agents 157. In such a case, the halo portion of the cognitive trait avatar may be updated dynamically as well, but with the changes being possibly less noticeable than the changes to the personality insight portrait, especially if the baseline for the halo portion is at least partially based on a historical analysis of the user's contributions to social networking websites.

As noted above, the cognitive traits correlation engine 156 may further utilize the cognitive traits avatar to compare the user's representation of their cognitive traits with the cognitive traits of other users, products, items, services, events, and other entities to determine compatibility between the user and these other entities. The user's personality insight portrait may be modified temporarily by the cognitive traits correlation engine 156, while the interaction is ongoing, so as to represent the degree of compatibility between the user and these other entities. For example, if the user's dominate cognitive traits include conscientiousness, and a particular product that the users is interested in is associated with the conscientiousness cognitive trait, then the personality insight portrait may be modified to indicate a strong compatibility between the user and the product with regard to the conscientiousness cognitive trait, e.g., changing the personality insight portrait to represent conscientiousness and/or output an indicator of a positive/negative correlation.

The cognitive traits associated with other entities, other than human beings, although in some illustrative embodiments human beings may be rated in this way as well, may be developed over time based on ratings provided to these other entities by users that have their own cognitive trait avatars. For example, the avatar dynamic monitoring and update engine 154 may receive information from agents 157 indicating user feedback provided by users of the system 104 and/or services hosted by the system 104 with regard to an entity. The cognitive traits associated with these users may be recorded and associated with the rating by the avatar dynamic monitoring and update engine 154 to determine a correlation between cognitive traits and positive user feedback with regard to the particular entity. These cognitive traits may then be used by the dynamic monitoring and update engine 154 to update a cognitive traits avatar associated with the entity which is stored in the cognitive traits avatar register 155. Thus, for example, if a majority of users that highly rate a product, have purchased the product, or otherwise given positive feedback regarding the product, have the "conscientiousness" cognitive trait as a dominant trait, then the conscientiousness cognitive trait may be associated with that product in the product's cognitive traits avatar. In this way, when another user is viewing a listing for the product via the computing system 104 or service hosted by the computing system 104, the user's cognitive traits avatar may be compared to the cognitive traits avatar of the product, by the cognitive traits correlation engine 156, and a degree of correlation may be calculated. This degree of correlation may then be used by the cognitive traits correlation engine 156 to temporarily update the cognitive traits avatar of the user to reflect the cognitive traits that are a strong match, if any, and/or a positive/negative aspect of the correlation, e.g., whether or not the user is likely to like or want to buy the product.

As touched on above, it should be appreciated that a similar cognitive traits avatar may be generated and displayed to users for various other types of entities other that human beings. Thus, in the example, above, a cognitive trait avatar may be generated for a product with corresponding halo portion representing the cognitive traits associated with the product. It should be appreciated that for non-human entities, the personality insight portrait portion of the cognitive traits avatar may be static and may represent the particular entity.

While the above illustrative embodiments are described with regard to the particular user's personality insight portrait being the one that is modified to represent the degree of correspondence between the user's cognitive traits and those of another entity, it should be appreciated that cognitive trait avatars for a plurality or all of the entities involved in an interaction may be dynamically updated to reflect correspondence of cognitive traits and/or current cognitive traits (personality traits) and moods of the entities. Thus, for example, rather than the personality insight portraits of other entities being static, in some cases the cognitive traits avatar for the other entity or entities may be dynamic based on a correspondence between the cognitive traits of the user and the cognitive traits of the entity as determined by the cognitive traits correlation engine 156. Again, as an example, a user looking to purchase a pet may have the personality insight portrait of individual cognitive trait avatars associated with different pets change based on whether the pet is determined to have similar cognitive traits to the particular user, e.g., a dog of breed A that is known to work well with people having cognitive trait X will have its personality insight portrait changed to the dog in a playful stance when the user has cognitive trait X as a dominant cognitive trait.

In some illustrative embodiments, the other entities involved in an interaction may be textual based entities, e.g., electronic documents, portions of text, web pages having text, or any other source of natural language content. The cognitive trait avatar of a user may be dynamically updated as the user interacts with such a portion of natural language text by performing natural language processing on the portion of natural language text, such as by the cognitive traits avatar engine 152, to extract features from the portion of natural language text and generating a cognitive traits avatar for the portion of natural language text. By comparing the features of the natural language text's cognitive traits avatar to the current status of the user's cognitive traits in the user's cognitive traits avatar, the personality insight portrait of the cognitive traits avatar of the user and/or the natural language text may be dynamically updated to reflect the user's alignment with regard to the content of the portion of natural language text, e.g., whether the user is likely to agree with, like, or otherwise look favorably on the portion of natural language text or not.

Thus, with the mechanisms of the illustrative embodiments, users are able to quickly identify other user's cognitive traits (personality traits) and identify whether the traits match their own or not through an easily identifiable visualization provided via the cognitive traits avatar. The cognitive traits avatar provides users with information relating to the current and/or historical status of another user's cognitive traits, current mood or emotional state, and the like. The cognitive traits avatar visualization also allows for easily identifiable matches or mis-matches between users and other entities to assist in decision making or better understanding of other parties in an interaction.

It should be appreciated that while FIG. 1 shows the cognitive traits avatar system 150 being separate from the computing systems 104 as a separate system and service that works in conjunction with the computing systems 104 and their hosted services, such as social networking websites, electronic commerce websites, and the like, the illustrative embodiments are not limited to such. Rather, the cognitive traits avatar system 150, and in fact the cognitive system 100 as a whole, may be co-located and/or integrated with the computing systems 104 such that the computing systems 104 may implement the elements of the cognitive traits avatar system 150 and/or cognitive system 100 as a whole. For example, a computing system 104 may provide a social networking website as a hosted service and, as part of this service, the cognitive system 100 and cognitive traits avatar system 150 may be provided for assisting in the depiction of user interactions, generating recommendations as to which other users a particular user may be interested in communicating with, or the like. In another example, the computing system 104 may provide an electronic commerce website as a hosted service and, as part of this service, the cognitive system 100 and cognitive traits avatar system 150 may be provided for assisting in depicting compatibility of a user's cognitive traits with particular products or services that are available for sale through the electronic commerce website. In this way, recommendations as to products that the user is likely to find of interest may be made to the user via the cognitive system 100. It can be appreciated that in illustrative embodiments where the mechanisms of the cognitive system 100 and/or cognitive traits avatar system 150 are co-located and/or integrated with the services hosted by a computing system 104, the agents 157 may not be necessary for the collection of information and may in fact be eliminated.

Figure 2:
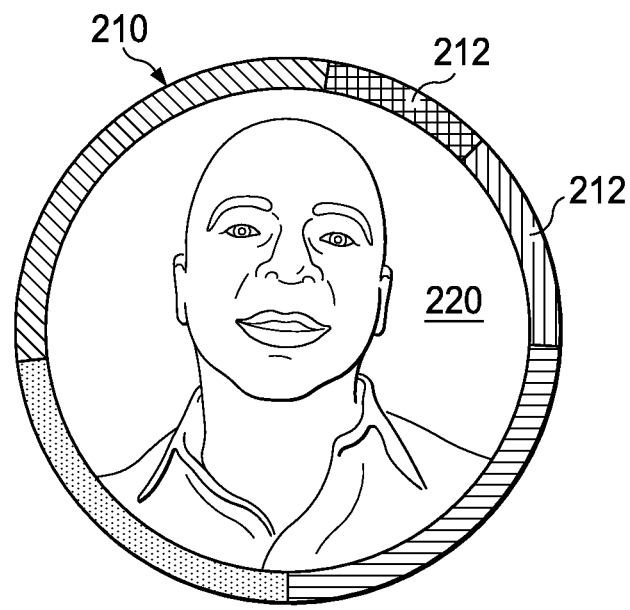
FIG. 2 is an example diagram of one illustrative embodiment of a graphical representation of a cognitive traits avatar for a user.

FIG. 2 is an example diagram of one illustrative embodiment of a graphical representation of a cognitive traits avatar for a user. As shown in FIG. 2, the graphical representation of the cognitive traits avatar, in one illustrative embodiment, involves the use of a "halo" or circular portion representation 210 surrounding a center portion 220 that comprises a portrait or representative image of the user, which may be selected from previously registered portraits or representative images that are associated with different sets of one or more cognitive traits, e.g., image 1 is associated with cognitive trait "Conscientiousness" while image 2 is associated with "Extraversion". It should be appreciated that multiple portraits may be associated with each cognitive trait, or combination of cognitive traits, so as to identify different levels of that cognitive trait, e.g., a first image associated with "Conscientiousness" may be representative of a strong or heavily weighted score for "Conscientiousness" while a second image associated with "Conscientiousness" may be associated with a weak or relatively low weighted score for "Conscientiousness".

The "halo" or circular representation 210 comprises sub-portions, or arcs 212, of the halo that are color coded, or otherwise conspicuously identifiable through visual means, to correspond to different cognitive traits (or personality traits) of the particular user as determined from the analysis of the moving window of content and/or the historical content, user profile, etc. The arcs 212 have sizes that correspond to the degree of dominance of particular cognitive trait. In some illustrative embodiments, these arcs 212 correspond to a set of primary cognitive traits with each primary cognitive trait being sub-divided into a number of sub-traits, which may be viewed when drilling down into the cognitive trait avatar representation, as described hereafter with regard to FIG. 3.

It should be appreciated that the representation of the halo 210 and the individual arcs 212 may be dynamically updated by the avatar dynamic monitoring and update engine 154 as the user continues to provide additional content to the monitored and analyzed social networking websites. Thus, for example, each arc 212 of the halo 210 may represent a percentage or score of the user's contributions to the social networking websites that the particular cognitive trait corresponds to and may have a corresponding color and size, e.g., 43% Extraversion, 78% Conscientiousness, 72% Agreeableness, 93% Openness, 33% Emotional Range, etc. in the depicted example. These measures of cognitive traits do not necessarily sum to 100% but instead represent percentages of how much of the user's interactions with the social networking website, either historically, within the moving window, or a combination of both, correspond to that particular type of cognitive trait, in addition to the baseline percentages or scores associated with these cognitive traits as determined from a baseline cognitive traits avatar generation operation as previously discussed above. It should be appreciated that a single statement by a user in the social networking website may correspond to multiple different cognitive traits and that as time goes on, the dynamic nature of the cognitive traits avatar causes the scores or percentages associated with the various cognitive traits to be more reflective of current conditions than the original baseline cognitive trait scores.

The cognitive trait avatar's halo 210 may be provided surrounding a currently selected personality insight portrait 220 that corresponds to the current cognitive traits (personality traits) of the user. In some illustrative embodiments, the personality insight portrait 220 presents a pictorial representation of the particular user and the current dominant cognitive trait(s) of the user, e.g., if the user's current dominant trait is conscientiousness, then a personality insight portrait 220 associated with conscientiousness may be selected, such as a picture of the user with an expression that is illustrative of focusing or concentrating on something, such as the user in a position and with an expression of considering an idea. Alternatively, in one illustrative embodiment, while the halo 210 may be based on historical analysis of the user's contributions to the one or more monitored and analyzed social network website, the personality insight portrait 220 may be based on a moving window of the contributions to the social network or other input indicative of the user's current cognitive (or personality) traits, i.e., representing the current mood of the user or viewpoint of the user. Thus, the halo 210 may be representative of an overall historical breakdown of the cognitive traits of the user while the personality insight portrait 220 may be a representation of a current dominant cognitive trait or traits of the user. Again, the personality insight portrait portion 220 and/or halo 210 of the cognitive trait avatar may be dynamically updated. As such, changes to the personality insight portrait portion 220 may be discerned by users more frequently than changes to the halo portion 210.

It should be appreciated that the selection of the image to be presented as the personality insight portrait portion 220 may be selected based on a correlation of the user's current dominant cognitive traits with the association of cognitive traits with particular portraits or images already registered with the cognitive traits avatar system. Thus, the system may determine the current dominant cognitive traits of the user and then search the metadata associated with the registered portraits or images for that user and select an image or portrait that has metadata associating the portrait or image with the currently most dominant cognitive trait of the user for which there is a matching portrait or image. Alternatively, a more complex selection algorithm may be used that weighs a subset of the cognitive traits, e.g., dominant cognitive traits, or all of the cognitive traits, e.g., both dominant and non-dominant cognitive traits, and selects a corresponding portrait or image whose metadata indicates cognitive traits that match the complex selection algorithm's determinations. Any selection methodology may be used without departing from the spirit and scope of the present invention.

Figure 3:
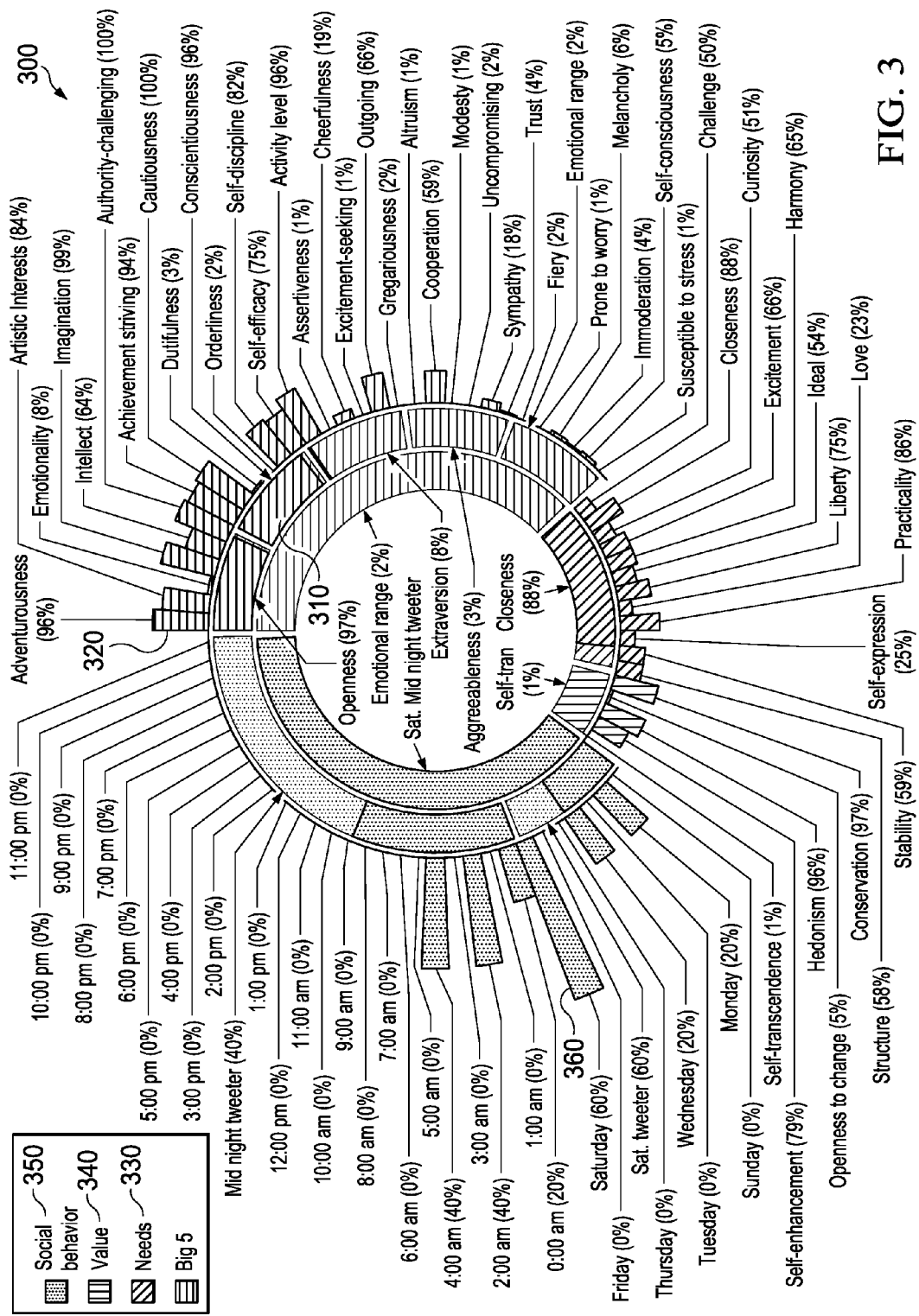
FIG. 3 is an example diagram of a graphical representation of a detailed view of a cognitive traits avatar of a user showing dominant cognitive traits and sub-traits in accordance with one illustrative embodiment.

FIG. 3 is an example diagram of a graphical representation of a detailed view of a cognitive traits avatar of a user showing dominant cognitive traits and sub-traits in accordance with one illustrative embodiment. The graphical representation shown in FIG. 3 may be obtained via a graphical user interface on a computing device when a user requests such a graphical representation to be presented, e.g., through clicking on a representation of a user's cognitive traits avatar, such as shown in FIG. 2, or otherwise entering a command to cause such a graphical representation as shown in FIG. 3 to be generated and output. The entering of the command to generate the detailed graphical representation of a cognitive traits avatar is referred to herein as "drilling-down" into the cognitive traits avatar.

As shown in FIG. 3, in response to drilling-down into the cognitive traits avatar, a pie-chart type representation of the relative compartmentalization of the cognitive traits of the cognitive traits avatar is presented. The detailed cognitive traits representation 300 includes portions 310 for each of the dominant cognitive traits, e.g., Emotional range, Openness, Conscientiousness, Extraversion, Agreeableness in this example (referred to in the diagram as the "Big 5") and corresponding bar graphs 320 for the sub-traits that correspond to the dominant cognitive traits. In the depicted example, the bar graphs 320 are extending away from the pie chart and are positioned in proximity to their corresponding dominant cognitive trait representation in the detailed cognitive traits representation 300.

In addition, the detailed cognitive traits representation 300 further includes portions 330, 340, and 350, respectively, for graphically depicting identified needs, values, and social behavior of the particular user. That is, through similar NLP analysis of contributions by the user to social networking websites, and the use of mapping mechanisms and NLP resources, an evaluation of the user's needs with regard to cognitive traits, values they value, as well as their social behavior via the social networking websites may be identified and represented in the detailed cognitive traits representation 300 with corresponding bar graphs 360 for providing a detailed breakdown of each of the portions 330-350.

The depiction in FIG. 3 provides a user a more detailed description of either themselves or a person with which they are interacting.

Figure 4:
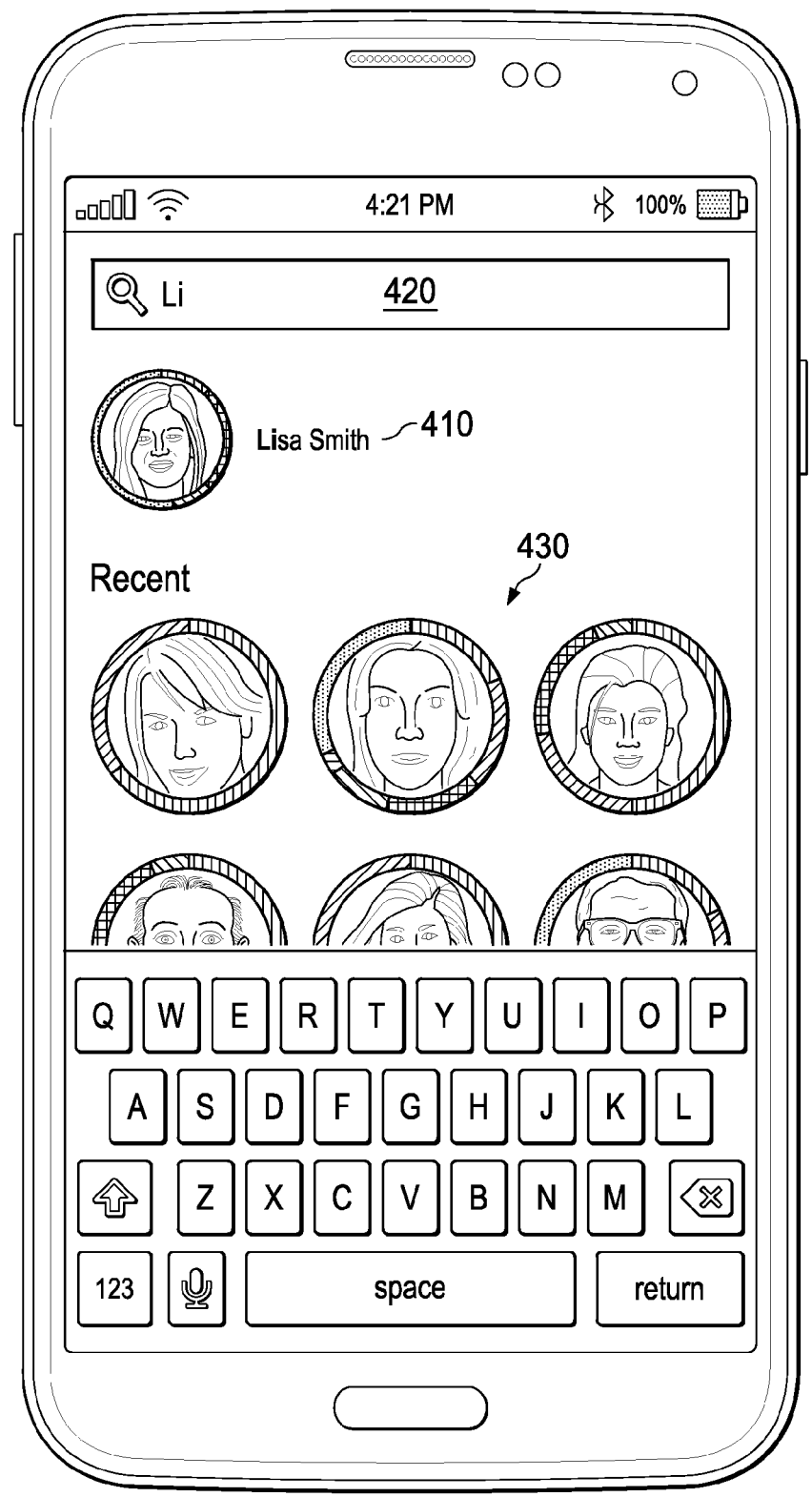
FIG. 4 is an example diagram illustrating a graphical user interface in which cognitive trait avatars for a plurality of users are provided as part of a communications application on a mobile device.

FIG. 4 is an example diagram illustrating a graphical user interface in which cognitive trait avatars for a plurality of users are provided as part of a communications application on a mobile device. The graphical user interface shown in FIG. 4 utilizes the cognitive traits avatar representations similar to that of FIG. 2 above. In the depicted example, the client computing device utilizing the cognitive traits avatar system 150 is a mobile communication device, e.g., a mobile phone, which includes a graphical user interface through which a user may access a social networking website or service, e.g., Facebook™, Instagram™, LinkedIn™, or the like.

As shown in FIG. 4, as part of the accessing of this social networking website, the user may be presented with representations of other user's cognitive traits avatars, each of which has a corresponding halo and personality insight portrait to represent the particular user with regard to the current user. In the particular example shown in FIG. 4, the cognitive traits avatars depicted include those with which the user has some association. For example, the cognitive traits avatar 410 is associated with a user "Lisa Starsky" whose name matches with characters in the search field 420. The cognitive traits avatars 430 correspond to other users with whom the user of the mobile device has recently communicated. Each of the cognitive traits avatars 410 and 430 are dynamically updated to represent the current cognitive trait status of each of these other users in the manner previously described above.

It should be appreciated that in this example, the depiction of the cognitive traits avatars are not limited to only those users with which the user of the mobile device has a previous association. That is, a user of the mobile device may desire to find other individuals with which to communicate via the social networking website. Based on a search request, which may be of a natural language question format or entry into a search field of a search engine, e.g., a natural language question of "What other people would I find interesting?" may be entered and a corresponding search conducted, the mechanisms of the illustrative embodiments may perform a cognitive traits avatar correlation operation with other users of the social networking website and generate a listing of results of persons with whom the user is likely to have a positive interaction and present that listing in a similar manner as the cognitive traits avatars 430 in FIG. 4. In such a case, the personality insight portraits of the various avatars may be modified to represent the cognitive traits that correlate with the user of the mobile device and/or the positive/negative correlation, as discussed previously.

It should be appreciated that a similar depiction, such as shown in FIG. 2, may be generated for the user of the mobile device itself and displayed on the mobile device. For example, when the user is considering a product for purchase, as discussed above, the correlation mechanisms of the illustrative embodiments may correlate the cognitive traits of the user with those associated with the product and determine a degree of matching. The personality insight portrait portion of the avatar may then be temporarily modified to represent a smiling image of the user if the correlation is positive or a frowning image if the correlation is not positive, as the user considers different products.

Thus, the illustrative embodiments provide mechanisms for providing a user a graphical representation of another user's cognitive traits so as to quickly identify other user's cognitive traits (personality traits) and identify whether the traits match their own or not through an easily identifiable visualization, referred to herein as the cognitive traits avatar. With the mechanisms of the illustrative embodiments, users are made aware as to the current and/or historical status of another user's cognitive traits, current mood or emotional state, and the like, as well as matches or mis-matches between users and other entities. Such information assists in decision making and better understanding of other parties in an interaction, such as a social networking dialog, electronic commerce transaction, or the like.

Figure 5:
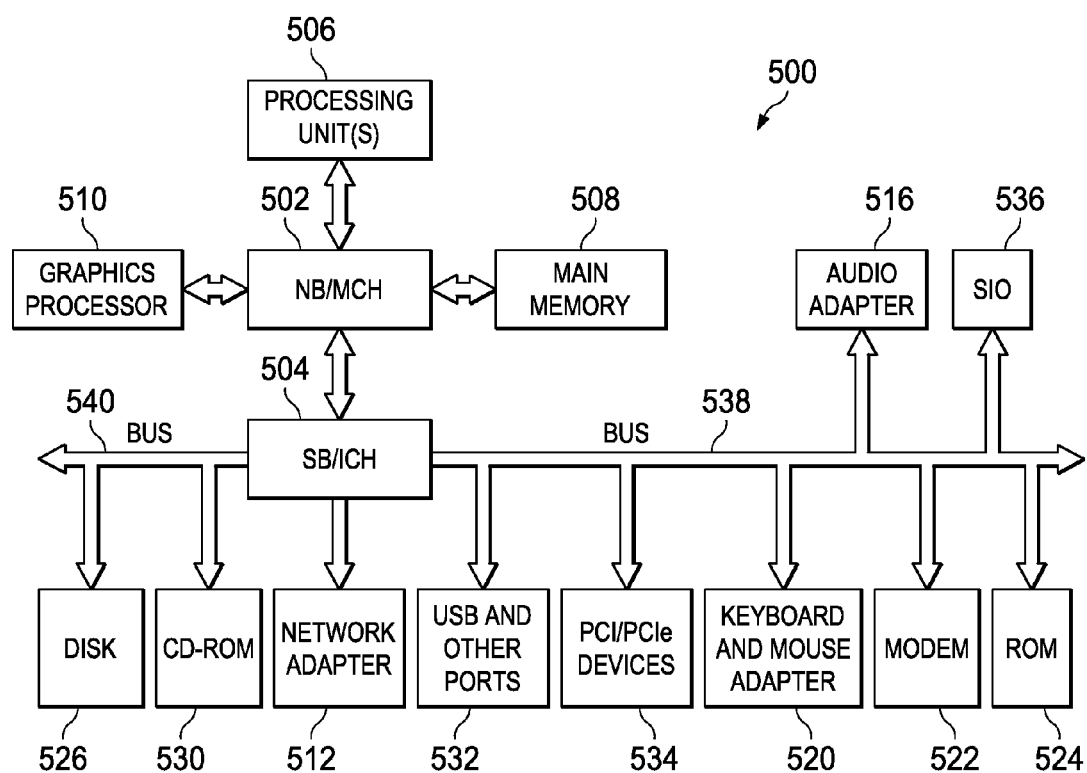
FIG. 5 is a block diagram of an example data processing system in which aspects of the illustrative embodiments are implemented.

FIG. 5 is a block diagram of an example data processing system in which aspects of the illustrative embodiments are implemented. Data processing system 500 is an example of a computer, such as computing system (e.g., a server) 104 or client 110 in FIG. 1, in which computer usable code or instructions implementing the processes for illustrative embodiments of the present invention are located. In one illustrative embodiment, FIG. 5 represents a server computing device, such as a server 104, which implements a cognitive system 100 and QA system pipeline 108, augmented to include and/or operate with the additional mechanisms of the illustrative embodiments, e.g., cognitive traits avatar system 150.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 is connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 is connected to SB/ICH 504.

An operating system runs on processing unit 506. The operating system coordinates and provides control of various components within the data processing system 500 in FIG. 5. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 500.

As a server, data processing system 500 may be, for example, an IBM® eServer™ System P® computer system, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and are loaded into main memory 508 for execution by processing unit 506. The processes for illustrative embodiments of the present invention are performed by processing unit 506 using computer usable program code, which is located in a memory such as, for example, main memory 508, ROM 524, or in one or more peripheral devices 526 and 530, for example.

A bus system, such as bus 538 or bus 540 as shown in FIG. 5, is comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, includes one or more devices used to transmit and receive data. A memory may be, for example, main memory 508, ROM 524, or a cache such as found in NB/MCH 502 in FIG. 5.

Those of ordinary skill in the art will appreciate that the hardware depicted in FIGS. 1 and 5 may vary depending on the implementation. Other internal hardware or peripheral devices, such as flash memory, equivalent non-volatile memory, or optical disk drives and the like, may be used in addition to or in place of the hardware depicted in FIGS. 1 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

As discussed above, the mechanisms of the illustrative embodiments for generating, dynamically updating, correlating, and outputting cognitive traits avatars is used in conjunction with a cognitive system. One example of such a cognitive system is a Question and Answer (QA) system, such as may be provided by the Watson™ cognitive system available from International Business Machines (IBM) Corporation of Armonk, N.Y. In such an embodiment, a user may submit a natural language question to the QA system, and corresponding answers may be generated and output as results to the user. In the context of the present invention, such questions may be of a type that attempt to find or recommend answers that are based on a user's cognitive traits as identified in a cognitive traits avatar associated with the user.

For example, a user may input the natural language question "Who am I compatible with?" or "What product is a good match for me?" or the like. This natural language question may be parsed, features extracted, and a determination made as to the question looking for an answer that is at least partially based on the user's own cognitive traits. As a result, the mechanisms of the illustrative embodiments may be utilized to correlate cognitive traits with other entities and generate a resulting list of candidate answers, which are then ranked according to a degree of matching. Thus, the illustrative embodiments may augment the operation of a QA system and the corresponding QA system pipelines. Therefore, a brief description of one example of a QA system pipeline is provided hereafter with a discussion of how the illustrative embodiments may be utilized to augment its operation.

Figure 6:
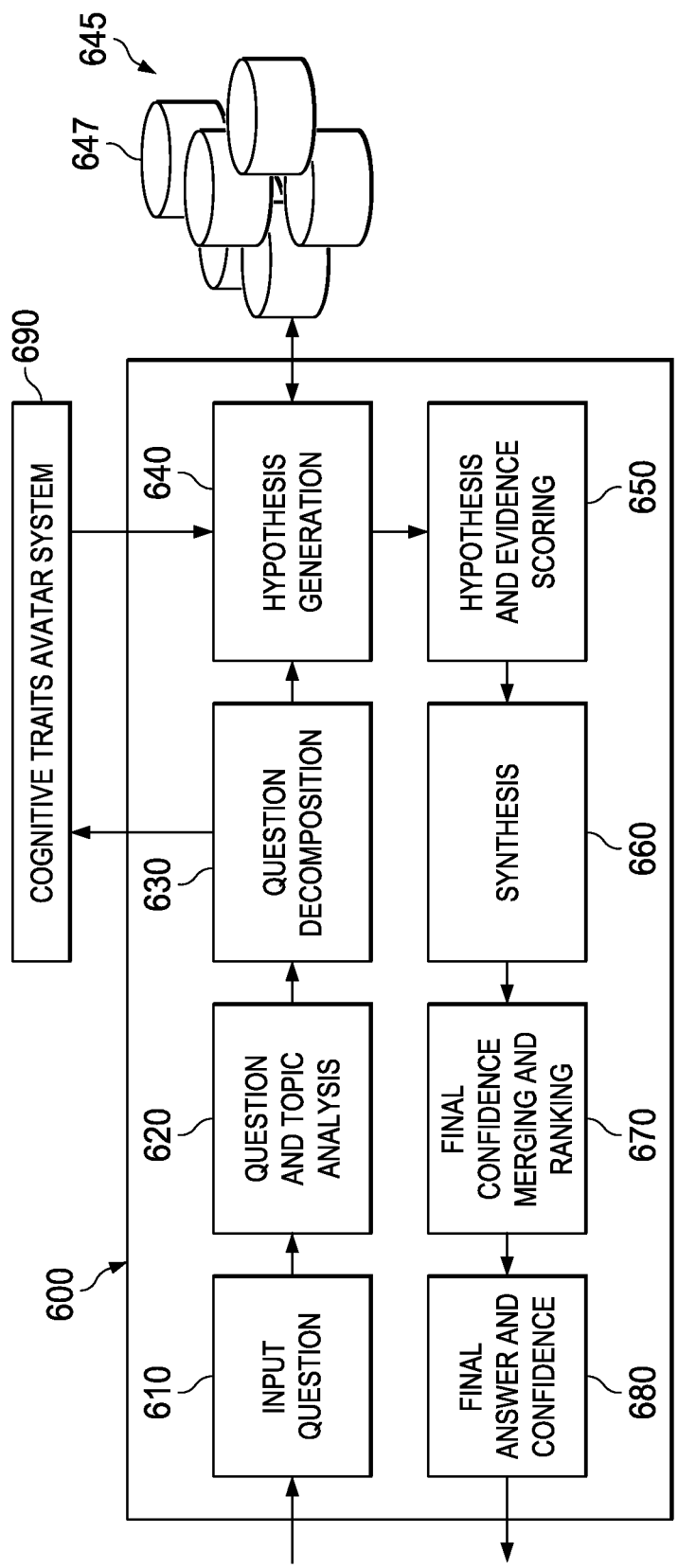
FIG. 6 illustrates a QA system pipeline for processing an input question in accordance with one illustrative embodiment.

FIG. 6 illustrates a QA system pipeline, of a cognitive system, for processing an input question in accordance with one illustrative embodiment. The QA system pipeline of FIG. 6 may be implemented, for example, as QA pipeline 108 of cognitive system 100 in FIG. 1. It should be appreciated that the stages of the QA pipeline shown in FIG. 6 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 6 is augmented, for example, in one or more of the stages to implement the improved mechanism of the illustrative embodiments described hereafter, additional stages may be provided to implement the improved mechanism, or separate logic from the pipeline 600 may be provided for interfacing with the pipeline 600 and implementing the improved functionality and operations of the illustrative embodiments.

As shown in FIG. 6, the QA pipeline 600 comprises a plurality of stages 610-680 through which the cognitive system operates to analyze an input question and generate a final response. In an initial question input stage 610, the QA pipeline 600 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 600, i.e. the question and topic analysis stage 620, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 6, the identified major features are then used during the question decomposition stage 630 to decompose the question into one or more queries that are applied to the corpora of data/information 645 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 645. That is, these various sources themselves, different collections of sources, and the like, represent a different corpus 647 within the corpora 645. There may be different corpora 647 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 647 within the corpora 645.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 640 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 640, to generate hypotheses for answering the input question. These hypotheses are also referred to herein as "candidate answers" for the input question. For any input question, at this stage 640, there may be hundreds of hypotheses or candidate answers generated that may need to be evaluated.

The QA pipeline 600, in stage 650, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 660, the large number of scores generated by the various reasoning algorithms are synthesized into confidence scores or confidence measures for the various hypotheses. This process involves applying weights to the various scores, where the weights have been determined through training of the statistical model employed by the QA pipeline 600 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 600 that identifies a manner by which these scores may be combined to generate a confidence score or measure for the individual hypotheses or candidate answers. This confidence score or measure summarizes the level of confidence that the QA pipeline 600 has about the evidence that the candidate answer is inferred by the input question, i.e. that the candidate answer is the correct answer for the input question.

The resulting confidence scores or measures are processed by a final confidence merging and ranking stage 670 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 680, a final answer and confidence score, or final set of candidate answers and confidence scores, are generated and output to the submitter of the original input question via a graphical user interface or other mechanism for outputting information.

As shown in FIG. 6, in accordance with one illustrative embodiment, the QA system pipeline 600 may be augmented to include or work in conjunction with a cognitive traits avatar system 690. The cognitive traits avatar system 690 may be invoked, for example, when the natural language question input 610 is parsed, features extracted by the question and topic analysis stage 620, and a determination is made, through question decomposition 630, that the question is looking for an answer that is at least partially based on the user's own cognitive traits. As a result, the question processing is passed to the cognitive traits avatar system 690 which retrieves the user's current cognitive traits avatar and performs a search of other cognitive traits avatars having one or more corresponding cognitive traits, scores the correspondence based on a determined degree of matching, and generates candidate answers in accordance with stages 640 and 650 as discussed above. Moreover, in the final output that is generated by the final answer and confidence stage 680 through the synthesis 660 and final confidence merging and ranking 670, cognitive traits avatar(s) for the user and/or matching entities may be output with the final answer(s), e.g., a listing of other users may be presented that have a highest match of cognitive traits with that of the present user and these users' cognitive traits avatars may be output as part of the final answer listing that is output via stage 680.

FIG. 7 is a flowchart outlining an example operation for generating a cognitive traits avatar in accordance with one illustrative embodiment. As shown in FIG. 7, the operation starts with a user initiating a registration operation with the cognitive system (step 710). The user provides one or more portraits or images representing the user to the cognitive system (step 720). Each of the one or more portraits or images are associated with corresponding cognitive traits via a manual entry by the user, an automatic image analysis, or a combination of manual entry and automatic image analysis, which are then stored as metadata in association with the corresponding images (step 730). Optionally, a user profile associated with the user and/or a user input specifying cognitive traits is analyzed to identify a baseline set of cognitive traits and their corresponding scores which is stored as a baseline cognitive traits avatar (step 740).

Thereafter, or alternatively, a portion of content submitted by the user to a system or service associated with the cognitive system, e.g., a social networking or electronic commerce website, is analyzed to identify indicators of cognitive traits associated with the user (step 750). As discussed above, such analysis may involve looking at a moving window of content. The analysis may utilize NLP mechanisms to extract features from textual content and correlate those features with cognitive traits, for example.

The indicators of cognitive traits are used to generate dynamic updates to the cognitive trait avatar (step 760) which are then applied to the cognitive traits avatar (step 770). The update modifies a first portion of the cognitive traits avatar that graphically represents the relative amount cognitive trait contribution to an overall personality of the user. Moreover, as part of this update, a corresponding portrait or image reflecting the current status of the dominant trait(s) is selected for use in a second portion of the cognitive traits avatar (step 780). A determination is then made as to whether the operation of the cognitive traits avatar generation should be discontinued, e.g., a communication session is ended, a user logs off the system, or the like (step 790). If not, the operation returns to step 750 and continues to dynamically update the cognitive traits avatar. If so, the operation terminates.

FIG. 8 is a flowchart outlining an example operation for correlating cognitive traits of cognitive traits avatars in accordance with one illustrative embodiment. The operation in FIG. 8 assumes that a cognitive traits avatar has already been generated for the user and for the other entities with which the user is contemplating engaging in an interaction, e.g., avatars are generated for other users, products for sale, services for sale, events of interest, or the like.

As shown in FIG. 8, the operation starts by receiving an input indicating the user's interest in a particular entity (step 810). This input, for example, may be a user selecting a representation of the entity, the user submitting a search request that identifies the entity as a potential result, the user submitting a natural language question whose processing results in the entity being a candidate answer, the user moving a mouse pointer over a representation of the entity, or any of a plethora of other inputs that may be indicative of the user's interest in the particular entity. For purposes of description, it is assumed that the user moves a mouse pointer over an image of a product for sale because the user is interested in possibly purchasing the product.

In response to the input, the cognitive traits avatar system performs a correlation operation to correlate a current state of cognitive traits of the user's cognitive traits avatar with the cognitive traits associated with the entity (step 820). The cognitive traits of the entity may comprise metadata that associates a listing of one or more cognitive traits and/or scores of cognitive traits with the particular entity, may be a cognitive traits avatar that has been generated for the entity, e.g., another user's cognitive traits avatar or a cognitive traits avatar generated for a product based on the cognitive traits of users providing feedback regarding the product, or the like. The correlation attempts to match the strongest cognitive traits, i.e. the ones having the highest scores or percentages, of the user with similar cognitive traits having similar relative strengths or scores for the product. Thus, for example, if the user's cognitive traits are strong in extraversion, and the product has a similarly strong scoring cognitive trait that corresponds to extraversion, or a sub-trait of extraversion, then a match may be determined to exist. A weighted calculation based on a plurality of cognitive traits and the degree to which they match between the user and the entity may be calculated to generate a score representative of the degree to which the user's cognitive traits match those of the entity (step 830). The degree of matching and the dominant cognitive traits that match are determined and used to select a portrait or image of the user that reflects the dominant cognitive trait and/or a positive/negative correlation (step 840). The selected portrait or image is then used to temporarily update the cognitive traits avatar of the user (step 850). This temporary update may be discontinued or rolled-back once the user no longer provides input indicative of interest in the entity. The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory providing instructions to the processor to cause the processor to implement a cognitive traits avatar system, for generating a cognitive traits avatar, the method comprising:
    analyzing, by the cognitive traits avatar system of the data processing system, a portion of content submitted by a user to extract features of the portion of content;
    mapping, by the cognitive traits avatar system, the extracted features to one or more cognitive traits;
    selecting, by the cognitive traits avatar system, an image corresponding to the one or more cognitive traits;
    generating, by the cognitive traits avatar system, a cognitive traits avatar comprising the selected image and cognitive traits data defining a graphical representation of the one or more cognitive traits for output in association with the selected image;
    outputting, by the cognitive traits avatar system, the cognitive traits avatar as part of an interaction of the user with another entity, or representation of another entity, via a computing device; and
    dynamically updating the cognitive traits avatar by changing at least one of the selected image or the cognitive traits data in response to the portion of content submitted by the user being changed.

2. The method of claim 1, wherein the portion of content is a dynamically moving window of textual input from the user to one or more social networking websites or online forums, and wherein dynamically updating the cognitive traits avatar comprises dynamically updating the cognitive traits avatar in response to the moving window of textual input moving to encompass new textual input from the user.

3. The method of claim 1, wherein generating the cognitive traits avatar comprises generating a graphical representation of the cognitive traits data having separate sections for each of a plurality of cognitive traits in the one or more cognitive traits, and wherein characteristics of each of the separate sections correspond to a relative degree of strength of a corresponding cognitive trait.

4. The method of claim 3, wherein the graphical representation of the cognitive traits data comprises a halo graphical representation surrounding the selected image, and wherein each of the separate sections is an arc of the halo graphical representation having a size based on the relative degree of strength of the corresponding cognitive trait.

5. The method of claim 1, further comprising:
    comparing the cognitive trait data to cognitive trait information associated with the another entity; and
    modifying the cognitive traits avatar based on a measure of correlation between the cognitive trait data and the cognitive trait information.

6. The method of claim 5, wherein modifying the cognitive traits avatar based on a measure of correlation between the cognitive trait data and the cognitive trait information comprises modifying the selected image based on the measure of correlation.

7. The method of claim 6, wherein modifying the selected image based on the measure of correlation comprises selecting an image depicting a positive or negative response by the user based on the measure of correlation, wherein in response to the measure of correlation indicating a high degree of correlation, a first image depicting a positive response by the user is selected, and wherein in response to the measure of correlation indicating a low degree of correlation, a second image depicting a negative response by the user is selected.

8. The method of claim 5, further comprising:
    creating the cognitive trait information associated with the another entity based on cognitive traits of users that provide feedback input for the another entity.

9. The method of claim 1, wherein the interaction of the user with another entity, or representation of another entity, via the computing device comprises at least one of:
    a communication with another user;
    a purchase of an item;
    a participation in an event;
    a use of an application; or
    a use of a computer service.

10. A computer program product comprising a computer readable storage medium having a computer readable program stored therein, wherein the computer readable program, when executed on a computing device, causes the computing device to implement a cognitive traits avatar system which operates to:

analyze a portion of content submitted by a user to extract features of the portion of content;

map the extracted features to one or more cognitive traits;

select an image corresponding to the one or more cognitive traits;

generate a cognitive traits avatar comprising the selected image and cognitive traits data defining a graphical representation of the one or more cognitive traits for output in association with the selected image;

output the cognitive traits avatar as part of an interaction of the user with another entity, or representation of another entity, via a computing device; and dynamically update the cognitive traits avatar by changing at least one of the selected image or the cognitive traits data in response to the portion of content submitted by the user being changed.

11. The computer program product of claim 10, wherein the portion of content is a dynamically moving window of textual input from the user to one or more social networking websites or online forums, and wherein the cognitive traits avatar system further operates to dynamically update the cognitive traits avatar at least by dynamically updating the cognitive traits avatar in response to the moving window of textual input moving to encompass new textual input from the user.

12. The computer program product of claim 10, wherein the cognitive traits avatar system further operates to generate the cognitive traits avatar at least by generating a graphical representation of the cognitive traits data having separate sections for each of a plurality of cognitive traits in the one or more cognitive traits, and wherein characteristics of each of the separate sections correspond to a relative degree of strength of a corresponding cognitive trait.

13. The computer program product of claim 12, wherein the graphical representation of the cognitive traits data comprises a halo graphical representation surrounding the selected image, and wherein each of the separate sections is an arc of the halo graphical representation having a size based on the relative degree of strength of the corresponding cognitive trait.

14. The computer program product of claim 10, wherein the cognitive traits avatar system further operates to:

compare the cognitive trait data to cognitive trait information associated with the another entity; and modify the cognitive traits avatar based on a measure of correlation between the cognitive trait data and the cognitive trait information.

15. The computer program product of claim 14, wherein the cognitive traits avatar system further operates to modify the cognitive traits avatar based on a measure of correlation between the cognitive trait data and the cognitive trait information at least by modifying the selected image based on the measure of correlation.

16. The computer program product of claim 15, wherein the cognitive traits avatar system further operates to modify the selected image based on the measure of correlation at least by selecting an image depicting a positive or negative response by the user based on the measure of correlation, wherein in response to the measure of correlation indicating a high degree of correlation, a first image depicting a positive response by the user is selected, and wherein in response to the measure of correlation indicating a low degree of correlation, a second image depicting a negative response by the user is selected.

17. The computer program product of claim 14, wherein the cognitive traits avatar system further operates to:

create the cognitive trait information associated with the another entity based on cognitive traits of users that provide feedback input for the another entity.

18. An apparatus comprising:

a processor; and a memory coupled to the processor, wherein the memory comprises instructions which, when executed by the processor, cause the processor to:

analyze a portion of content submitted by a user to extract features of the portion of content;

map the extracted features to one or more cognitive traits;

select an image corresponding to the one or more cognitive traits;

generate a cognitive traits avatar comprising the selected image and cognitive traits data defining a graphical representation of the one or more cognitive traits for output in association with the selected image; and output the cognitive traits avatar as part of an interaction of the user with another entity, or representation of another entity, via a computing device; and dynamically update the cognitive traits avatar by changing at least one of the selected image or the cognitive traits data in response to the portion of content submitted by the user being changed.

* * * * *